(12) United States Patent
Deacon (10) Patent No.: US 8,745,616 B1
(45) Date of Patent: Jun. 3, 2014

(54) SYSTEMS AND METHODS FOR PROVIDING DIGITAL CERTIFICATES THAT CERTIFY THE TRUSTWORTHINESS OF DIGITALLY SIGNED CODE

(75) Inventor: William Deacon, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/243,116

(22) Filed: Sep. 23, 2011

(51) Int. Cl.
*G06F 21/00* (2013.01)

(52) U.S. Cl.
USPC ............................. 717/177; 726/25; 713/158

(58) Field of Classification Search
USPC ........................................................ 713/175
See application file for complete search history.

(56) References Cited

U.S. PATENT DOCUMENTS

| | | | | |
|---|---|---|---|---|
| 5,892,904 | A * | 4/1999 | Atkinson et al. | 726/22 |
| 6,766,353 | B1 * | 7/2004 | Lin et al. | 709/203 |
| 8,572,368 | B1 * | 10/2013 | Deacon | 713/158 |
| 8,589,691 | B1 * | 11/2013 | Hackborn et al. | 713/176 |
| 2004/0025022 | A1 * | 2/2004 | Yach et al. | 713/176 |
| 2007/0240194 | A1 | 10/2007 | Hargrave et al. | |
| 2009/0249075 | A1 * | 10/2009 | De Atley et al. | 713/176 |
| 2012/0096516 | A1 * | 4/2012 | Sobel et al. | 726/2 |

OTHER PUBLICATIONS

William Deacon; Systems and Methods for Generating Code-Specific Code-Signing Certificates Containing Extended Metadata; U.S. Appl. No. 13/243,047, filed Sep. 23, 2011.
Ieblog; "Stranger Danger"—Introducing SmartScreen Application Reputation; http://blogs.msdn.com/b/ie/archive/2010/13/stranger-danger-introducing-smartscreen-application-reputation.aspx; Oct. 13, 2010.

* cited by examiner

*Primary Examiner* — Hadi Armouche
*Assistant Examiner* — Bryan Wright
(74) *Attorney, Agent, or Firm* — ALG Intellectual Property, LLC (57) ABSTRACT

A computer-implemented method for verifying the trustworthiness of code prior to issuing code-signing certificates may include (1) receiving a request from a software publisher to sign code, the request including a copy of the code and a digital signature that verifies the integrity of the code, (2) prior to signing the code, verifying the trustworthiness of the code based at least in part on an analysis of the copy of the code included within the request, (3) upon verifying the trustworthiness of the code, signing the code by generating a digitally signed trustworthiness certificate for the code that certifies that the code is trustworthy, and then (4) providing the trustworthiness certificate to the software publisher to enable the software publisher to attest that the code is trustworthy. Various additional methods, systems, and encoded computer-readable media are also disclosed.

20 Claims, 6 Drawing Sheets

SYSTEMS AND METHODS FOR PROVIDING DIGITAL CERTIFICATES THAT CERTIFY THE TRUSTWORTHINESS OF DIGITALLY SIGNED CODE

BACKGROUND

Many software publishers digitally "sign" files or applications created or published by the publisher in order to demonstrate the authenticity of such files and applications. For example, a software publisher may digitally sign a file by encrypting a checksum or hash of the file using a public-key cryptographic system in order to enable recipients to verify that the file was both created by the publisher and has not been altered since leaving the publisher's possession.

Because malicious or unscrupulous individuals or entities may attempt to pose as respected software publishers when distributing files, a software publisher may also obtain, and include within all files that it subsequently publishes, a digital certificate from a well-known and/or trusted certificate authority that certifies that files signed by the publisher in fact originated from the publisher in question. A digital certificate, which is typically digitally signed by a trusted certificate authority using the certificate authority's private cryptographic key, attests that a particular public key belongs to an identified entity, thereby enabling recipients to verify that a digitally signed file in fact originated from a particular entity.

Unfortunately, current digital certificates (and the authorities responsible for generating the same) fail to make any statement as to the trustworthiness of a digitally signed file and/or the publisher of such a file. As such, the fact that a digitally signed file includes a certificate from a trusted certificate authority does not preclude the possibility that the file contains (either intentionally or unintentionally) malware and/or other vulnerabilities. Accordingly, the instant disclosure identifies and addresses a need for systems and methods for providing digital certificates that attest as to the trustworthiness of digitally signed code.

SUMMARY

As will be described in greater detail below, the instant disclosure generally relates to systems and methods for providing digital certificates that certify the trustworthiness of digitally signed code. In one example, a computer-implemented method for accomplishing such a task may include (1) receiving a request from a software publisher to sign code (the request including both a copy of the code and a digital signature that verifies the integrity of the code), (2) prior to signing the code, verifying the trustworthiness of the code based at least in part on an analysis of the copy of the code included within the request, (3) upon verifying the trustworthiness of the code, signing the code by generating a digitally signed trustworthiness certificate for the code that certifies that the code is trustworthy, and then (4) providing the trustworthiness certificate to the software publisher to enable the software publisher to attest that the code is trustworthy.

In some embodiments, the step of verifying the trustworthiness of the code may include scanning the code for malware and/or testing the code for vulnerabilities, bugs, and/or other objectionable behavior. In one example, the step of scanning the code for malware may include automatically scanning the code for malware using computer-security software provided by a plurality of different security-software vendors. In addition, the step of testing the code for vulnerabilities, bugs, and/or objectionable behavior may include testing the code using at least one automated test and/or receiving the results of at least one manual test performed on the code. In some examples, the step of verifying the trustworthiness of the code may include (1) requesting that a third-party testing entity verify the trustworthiness of the code and then (2) receiving an indication from the third-party testing entity that the code has been tested and found to be trustworthy.

In one example, the trustworthiness certificate may represent a unique, code-specific certificate that is valid only for the code identified in the request. In another example, the trustworthiness certificate may include metadata that indicates that the code is trustworthy. The trustworthiness certificate may also include information that identifies the software publisher, information that identifies an entity responsible for signing the code, a checksum of the code, and/or a digital signature created by the code-signing service using a private key.

In some embodiments, the method may also include, upon providing the trustworthiness certificate to the software publisher, performing periodic reviews of the code in order to verify that the code remains trustworthy. In such embodiments, the method may also include (1) determining, during a periodic review of the code, that the code is no longer trustworthy and then (2) revoking the trustworthiness certificate upon determining that the code is no longer trustworthy.

All or a portion of the above-described method may be performed by a computing device of the software publisher that initiated the code-signing request and/or a remote computing device operated by a code-signing service (such as, e.g., a certificate authority).

In one embodiment, a system for implementing the above-described method may include an intake module programmed to receive a request from a software publisher to sign code (as detailed above, such a request may include both a copy of the code and a digital signature that verifies the integrity of the code). The system may also include a verification module programmed to verify, before the code is signed, the trustworthiness of the code based at least in part on an analysis of the copy of the code included within the request. In addition, the system may include a signing module programmed to sign the code after the trustworthiness of the code has been verified by generating a digitally signed trustworthiness certificate for the code that certifies that the code is trustworthy. The system may also include a delivery module programmed to provide the trustworthiness certificate to the software publisher to enable the software publisher to attest that the code is trustworthy. The system may also include at least one processor configured to execute the intake module, the verification module, the signing module, and the delivery module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a request from a software publisher to sign code, the request including both a copy of the code and a digital signature that verifies the integrity of the code, (2) prior to signing the code, verify the trustworthiness of the code based at least in part on an analysis of the copy of the code included within the request, (3) upon verifying the trustworthiness of the code, sign the code by generating a digitally signed trustworthiness certificate for the code that certifies that the code is trustworthy, and then (4) provide the trustworthiness certificate to the software publisher to enable the software publisher to attest that the code is trustworthy.

As will be explained in greater detail below, by verifying the trustworthiness of code prior to signing such code (by, e.g., scanning and/or testing code for malware, bugs, vulnerabilities, and/or other unwanted behavior), the systems and methods described herein may enable code-signing services to avoid digitally signing defective and/or malicious code. In addition, by digitally signing verified code with trustworthiness certificates, the systems and methods described herein may enable relying parties to verify the integrity of, and confidently rely upon, such code (and, by inference, the developer and/or publisher of such code), potentially resulting in decreased instances of malware infection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
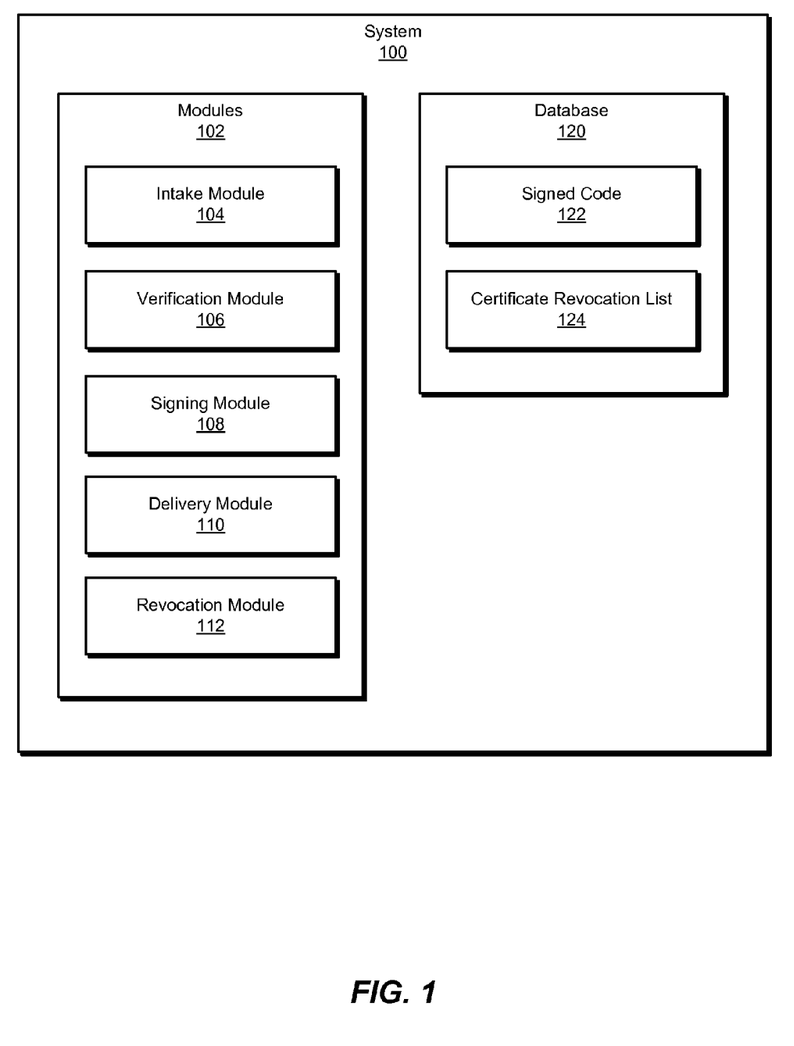
FIG. 1 is a block diagram of an exemplary system for providing digital certificates that certify the trustworthiness of digitally signed code.
Figure 2:
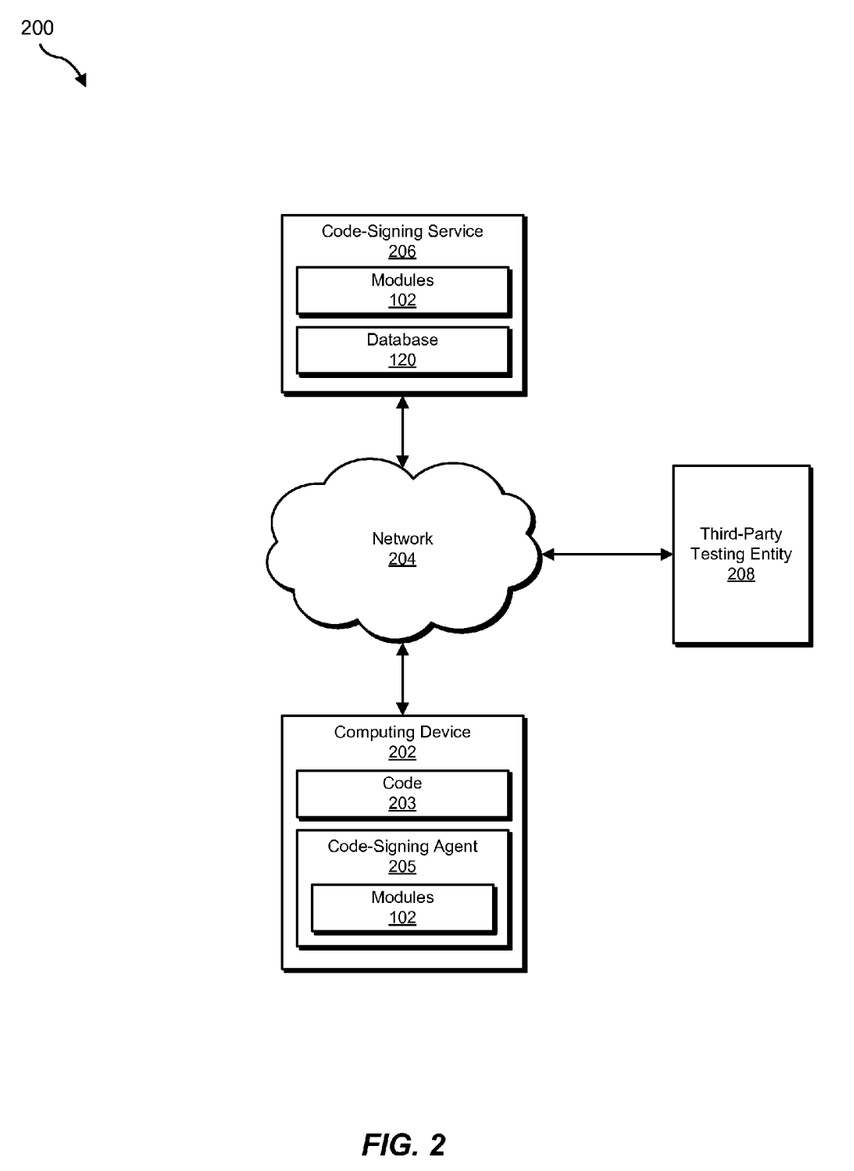
FIG. 2 is a block diagram of an exemplary system for providing digital certificates that certify the trustworthiness of digitally signed code.

The following will provide, with reference to FIGS. 1-2, detailed descriptions of exemplary systems for providing digital certificates that certify the trustworthiness of digitally signed code. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for providing digital certificates that certify the trustworthiness of digitally signed code. As illustrated in this figure, exemplary system 100 may include one or more modules 102 for performing one or more tasks. For example, and as will be explained in greater detail below, exemplary system 100 may include an intake module 104 programmed to receive a request from a software publisher to sign code. System 100 may also include a verification module 106 programmed to verify, before the code is signed, the trustworthiness of the code based at least in part on an analysis of a copy of the code included within the request.

In addition, system 100 may include a signing module 108 programmed to sign the code after the trustworthiness of the code has been verified by generating a digitally signed trustworthiness certificate for the code that certifies that the code is trustworthy. System 100 may also include a delivery module 110 programmed to provide the trustworthiness certificate to the software publisher to enable the software publisher to attest that the code is trustworthy. In addition, system 100 may include a revocation module 112 programmed to revoke a trustworthiness certificate associated with previously signed code that is no longer trusted. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or code-signing service 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store both (1) copies of signed code 122 and (2) a certificate revocation list 124 that identifies invalid certificates.

Database 120 may represent portions of a single database or computing device or a plurality of databases or computing devices. For example, database 120 may represent a portion of code-signing service 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as code-signing service 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a code-signing service 206 and/or a third-party testing entity 208 via a network 204.

In one embodiment, one or more of modules 102 from FIG. 1 may, when executed by at least one processor of computing device 202 and/or code-signing service 206, enable computing device 202 and/or code-signing service 206 to verify the trustworthiness of, and then generate digitally signed trustworthiness certificates for, code submitted for approval by software publishers. For example, and as will be described in greater detail below, one or more of modules 102 may cause code-signing service 206 to (1) receive a request from a software publisher (via, e.g., computing device 202) to sign code (e.g., code 203), (2) prior to signing the code, verify the trustworthiness of the code based at least in part on an analysis of a copy of the code included within the request, (3) upon verifying the trustworthiness of the code, sign the code by generating a digitally signed trustworthiness certificate for the code that certifies that the code is trustworthy, and then (4) provide the trustworthiness certificate to the software publisher to enable the software publisher to attest that the code is trustworthy.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device. In one example, computing device 202 may be operated by a software developer or publisher.

In one example, computing device 202 may include a code-signing agent 205. As will be explained in greater detail below, in some examples code-signing agent 205 may, either alone or in combination with services provided by code-signing service 206, verify the trustworthiness of, and then generate digitally signed trustworthiness certificates for, code submitted for approval by software publishers. As with other aspects of system 200, code-signing agent 205 may be implemented using a wide range of hardware, software, or firmware (or any combination thereof) configurations (including, e.g., trusted hardware components).

Code-signing service 206 generally represents any type or form of computing device that is capable of verifying the trustworthiness of, and/or generating digitally signed trustworthiness certificates for, code submitted for approval by software publishers. Examples of code-signing service 206 include, without limitation, application servers and database servers configured to provide various database services and/or run certain software applications. In one example, code-signing service 206 may be operated by a reputable or trusted entity, such as a certificate authority or computer-security software vendor (e.g., SYMANTEC CORPORATION).

Third-party testing entity 208 generally represents any type or form of computing device or entity that is capable of verifying the trustworthiness of code submitted for approval by software publishers. Examples of third-party testing entity 208 include, without limitation, software testing houses and/or application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202, code-signing service 206, and/or third-party testing entity 208.

Figure 3:
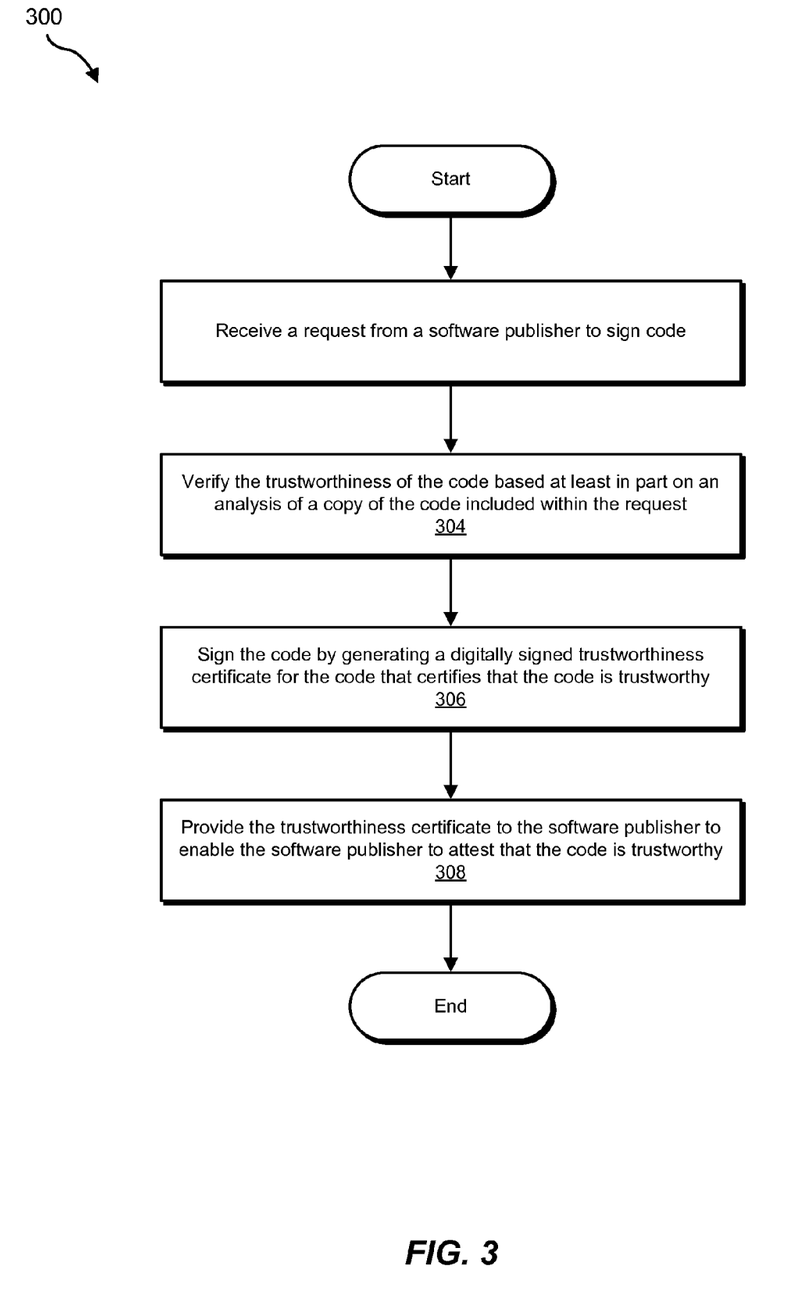
FIG. 3 is a flow diagram of an exemplary method for providing digital certificates that certify the trustworthiness of digitally signed code.

FIG. 3 is a flow diagram of an exemplary computer-implemented method 300 for providing digital certificates that certify the trustworthiness of digitally signed code. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 the systems described herein may receive a request from a software publisher to sign code. For example, intake module 104 may, as part of code-signing service 206 in FIG. 2, receive a request from a computing device 202 (which may, as detailed above, be operated by a software publisher) to sign code 203.

The term "software publisher," as used herein, generally refers to any entity that is capable of generating and/or distributing code. Examples of software publishers include, without limitation, software developers (i.e., individuals or entities responsible for generating or creating software applications), content providers (i.e., individuals or entities responsible for generating or creating digital content), distributors of software or content (i.e., individuals or entities that distribute or publish software applications or content created by others), or the like.

In addition, the term "code," as used herein, generally refers to any type or form of computer-readable instruction that is capable of being digitally signed. Examples of such code include, without limitation, executable files, data files, digital content (e.g., audio files, image files, video files, etc.), or any other computer-readable object that is capable of being digitally signed.

In some examples, the request received in step 302 may include both (1) a copy of the code in question and (2) a digital signature that verifies the integrity of the code in question. The phrase "digital signature," as used herein, generally refers to any type or form of mathematical scheme for demonstrating the authenticity of a digital object. In one example, a software publisher may generate such a digital signature by (1) generating a checksum or hash of the code in question and then (2) encrypting this checksum using a private cryptographic key.

In the above example, code-signing service 206 may validate the digital signature contained within the request received in step 302 by (1) calculating a checksum or hash of the copy of code 203 contained within the request received in step 302, (2) decrypting, using a public cryptographic key associated with the software publisher, the digital signature contained within the request received in step 302 in order to obtain an expected checksum, and then (3) determining that the expected checksum matches the calculated checksum. Validating the digital signature in this manner may verify that the copy of code 203 contained within the request received in step 302 has not been modified or tampered with since leaving the possession of the software publisher.

The systems described herein may perform step 302 as part of a computing device operated by the software publisher that initiated the code-signing request and/or as part of a remote computing device operated by a code-signing service (such as, e.g., a certificate authority). For example, in one embodiment intake module 104 may, as part of code-signing service 206 in FIG. 2, receive a request to sign code 203 from a remote computing device (e.g., computing device 202) via network 204. In another example, intake module 104 may, as part of code-signing agent 205 on computing device 202, receive a request from a user or application of computing device 202 to sign code 203 located on computing device 202.

Returning to FIG. 3, at step 304 the systems described herein may, prior to signing the code contained within the request received in step 302, verify the trustworthiness of this code based at least in part on an analysis of the code itself. For example, verification module 106 may, as part of code-signing service 206 in FIG. 2, verify the trustworthiness of code 203 received in step 302 based at least in part on an analysis of this code.

The systems described herein may perform step 304 in a variety of ways. In one example, the systems described herein may verify the trustworthiness of the code by verifying that the code does not represent or contain malware (which, as that term is used herein, may include adware, spyware, grayware, or the like). For example, verification module 106 may verify the trustworthiness of code 203 received in step 302 by automatically scanning code 203 for malware using any of a variety of malware-detection techniques (including, e.g., signature-based and/or heuristic-based techniques).

In some examples, verification module 106 may automatically scan code 203 for malware using any of a variety of forms of computer-security software. In this example, verification module 106 may, prior to scanning code 203 using such software, ensure that this software is up-to-date (by, e.g., ensuring that the software contains or possesses the most-recent malware-detection definition sets). Because different computer-security software offerings may provide differing levels of protection, in some examples verification module 106 may scan code 203 for malware using computer-security software provided by a plurality of different security-software vendors in an attempt to ensure that all known malware variants will be detected.

In some examples, the systems described herein may verify the trustworthiness of the code received in step 302 by (either in addition to, or in place of, the malware scan(s) described above) testing the code for vulnerabilities, bugs, and/or objectionable behavior (i.e., malicious and/or other unwanted behavior). For example, verification module 106 may automatically test code 203 for vulnerabilities, bugs, and/or objectionable behavior using at least one automated test designed by software test engineers. Additionally or alternatively, one or more software test engineers may manually test code 203 for vulnerabilities, bugs, and/or objectionable behavior and then provide the results of such a test to verification module 106.

As with step 302, the systems described herein may perform step 304 as part of a computing device operated by the software publisher that initiated the code-signing request and/or as part of a remote computing device operated by a code-signing service (such as, e.g., a certificate authority). For example, verification module 106 may verify the trustworthiness of code 203 as part of code-signing agent 205 located on computing device 202 in FIG. 2. Additionally or alternatively, verification module 106 may verify the trustworthiness of code 203 as part of code-signing service 206. In another example, verification module 106 may (either in place of, or in addition to, any verification tests performed by computing device 202 and/or code-signing service 206) request that a third-party testing entity (such as third-party testing entity 208 in FIG. 2) verify the trustworthiness of code 203. In this example, verification module 106 may verify the trustworthiness of code 203 by receiving an indication from third-party testing entity 208 that code 203 has been tested and found to be trustworthy.

In some examples, verification module 106 may send a notice to the software publisher that initiated the request in step 302 that the code submitted in step 302 is being tested in order to verify its trustworthiness. In this example, verification module 106 may notify the software publisher when the verification process is complete.

Returning to FIG. 3, at step 306 the systems described herein may, upon verifying the trustworthiness of the code in step 304, sign the code by generating a digitally signed trustworthiness certificate for the code that certifies that the code is trustworthy. For example, signing module 108 may, as part of code-signing service 206 in FIG. 2, sign code 203 by generating a digitally signed trustworthiness certificate for code 203.

The phrase "digitally signed trustworthiness certificate" (or simply "trustworthiness certificate"), as used herein, generally refers to an electronic document issued by a code-signing service (such as a certificate authority) that attests that the code in question is trustworthy. Trustworthiness certificates may take a variety of forms and may include a variety of information. In some examples, the trustworthiness certificate generated in step 306 may include (1) information that uniquely identifies a publisher of the code in question (using, e.g., the distinguished name of the publisher), (2) information that uniquely identifies the code-signing service or certificate authority responsible for generating the trustworthiness certificate (using, e.g., the distinguished name of the code-signing service or certificate authority), (3) a hash or checksum of the code in question, and/or (4) a digital signature generated by the certificate authority. In some examples, this trustworthiness certificate may also include a variety of additional information, such as information that indicates whether the code has been scanned for malware and/or tested for bugs, vulnerabilities, and/or objectionable behavior. In one example, this additional information may be included as metadata within a certificate extension within the trustworthiness certificate.

Figure 4:
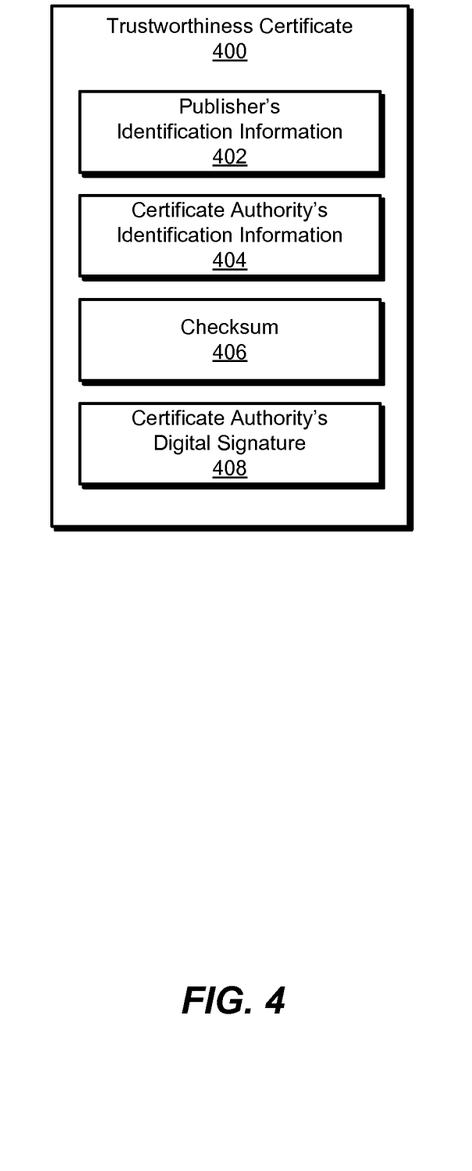
FIG. 4 is an illustration of an exemplary trustworthiness certificate.

Trustworthiness certificate 400 in FIG. 4 is an illustration of an exemplary trustworthiness certificate. As illustrated in this figure, exemplary trustworthiness certificate 400 may include (1) publisher identification information 402 (which may include the distinguished name of the publisher of the code in question), (2) certificate authority identification information 404 (which may include the distinguished name of the certificate authority that created trustworthiness certificate 400), (3) checksum 406, and (4) the certificate authority's digital signature 408. In one example, the certificate authority responsible for generating trustworthiness certificate 400 may digitally sign trustworthiness certificate 400 by hashing all or a portion of the information contained within trustworthiness certificate 400 (e.g., publisher identification information 402, certificate authority identification information 404, and/or checksum 406) and then encrypting the same using a private cryptographic key, resulting in certificate authority's digital signature 408.

In some examples, the private key used by the certificate authority to digitally sign trustworthiness certificate 400 may represent the private-key portion of an asymmetric key pair that was created specifically for, and that is unique to, the code in question. For example, signing module 108 may create a new asymmetric key pair for each code-signing request that it receives. In this example, by signing each set of code using a new key pair that is unique to the code in question, signing module 108 may create a trustworthiness certificate that represents a unique, code-specific certificate that is valid only for the code in question.

In other examples, the private key used by the certificate authority to digitally sign trustworthiness certificate 400 may represent the private-key portion of an asymmetric key pair that was created specifically for, and that is unique to, a family of code (such as all versions of a particular application). For example, signing module 108 may create a new asymmetric key pair for each application (including all versions of the application) that is to be signed. In this example, by signing each version of an application using the asymmetric key pair that is unique to the application, signing module 108 may create a trustworthiness certificate that represents an application-specific certificate that is valid only for the various versions of the application in question.

In some examples, signing module 108 may also include the public-key portion of the asymmetric key pair used to digitally sign the trustworthiness certificate within the trustworthiness certificate itself, thereby enabling relying parties to decrypt the digital signature contained within the trustworthiness certificate in order to verify the integrity of its contents. In one embodiment, code-signing module 108 may also dispose of the private key used to digitally sign the trustworthiness certificate to ensure that this private key is never compromised.

As with prior steps, the systems described herein may perform step 306 as part of a computing device operated by the software publisher that initiated the code-signing request and/or as part of a remote computing device operated by a code-signing service (such as, e.g., a certificate authority). For example, signing module 108 may sign code 203 as part of code-signing agent 205 on computing device 202 in FIG. 2. In this example, code-signing agent 205 may either sign code 203 on its own or in combination with services performed by code-signing service 206. In another example, signing module 108 may sign code 203 as part of code-signing service 206.

Returning to FIG. 3, at step 308 the systems described herein may provide the trustworthiness certificate generated in step 306 to the software publisher in order to enable the software publisher to attest that the code in question is trustworthy. For example, delivery module 110 may, as part of code-signing service 206 in FIG. 2, provide trustworthiness certificate 400 to computing device 202 (which may, as detailed above, be operated by the publisher of code 203). The publisher of code 203 may then use trustworthiness certificate 400 when publishing or distributing code 203 to attest that code 203 is trustworthy.

The trustworthiness certificate provided in step 308 may attest to relying parties that code is trustworthy in a variety of ways. In one example, relying parties may trust that code is trustworthy simply because the code has been digitally signed (using, e.g., a trustworthiness certificate, as described herein) by a reputable or trusted entity, such as a certificate authority or computer-security software vendor (e.g., SYMANTEC CORPORATION). In this example, the trusted signing entity's digital signature may indicate to the relying party that the code in question has been tested and found to be trustworthy by the signing entity.

In other examples, the trustworthiness certificate may include information that indicates whether the code in question has been scanned for malware and/or tested for bugs, vulnerabilities, and/or objectionable behavior. As detailed above, in one example this information may be included as metadata within a certificate extension within the trustworthiness certificate. In this example, relying parties and/or software subsystems may define various rules and/or policies for determining (either on endpoints or via proxies) the trustworthiness of code based on such metadata.

In some examples, the systems described herein may perform periodic reviews of code that was previously digitally signed by the code-signing service in order to verify that this signed code remains trustworthy. For example, after signing module 108 digitally signs code that has been verified as trustworthy in step 306, signing module 108 may then store a copy of this signed code within database 120 of code-signing service 206 in FIG. 2. In this example, verification module 106 may perform periodic reviews (e.g., on a daily, weekly, monthly, or annual basis) of signed code 122 within database 120 in order to verify that this signed code remains trustworthy (i.e., in order to identify zero-day issues that may have been present in such signed code).

For example, verification module 106 may periodically scan signed code 122 within database 120 using new and/or updated malware-definition sets in order to determine whether any of the signed code contained within database 120 contains or represents malware that was newly identified within such updated malware-definition sets. If verification module 106 determines, during a periodic review of the signed code contained within database 120, that code contained within this database is no longer trustworthy (due to, e.g., the code containing a form of malware that was newly identified by the updated malware-definition set), then revocation module 112 may revoke the trustworthiness certificate associated with this code in order to prevent relying parties from trusting this code.

Revocation module 112 may revoke trustworthiness certificates in a variety of ways. In one example, revocation module 112 may add the trustworthiness certificate in question to a certificate revocation list (e.g., certificate revocation list 124 in FIG. 1) maintained by code-signing service 206. Code-signing service 206 may then immediately publish an updated version of certificate revocation list 124 and/or publish an updated version of certificate revocation list 124 in accordance with a predefined publishing schedule in order to inform relying parties that the certificate in question is no longer valid. In another example, revocation module 112 may make the revoked status of a trustworthiness certificate known via a protocol or service, such as the Online Certificate Status Protocol (OCSP).

Upon completion of step 308, the logical flow of exemplary method 300 in FIG. 3 may terminate.

As detailed above, by verifying the trustworthiness of code prior to signing such code (by, e.g., scanning and/or testing code for malware, bugs, vulnerabilities, and/or other unwanted behavior), the systems and methods described herein may enable code-signing services to avoid digitally signing defective and/or malicious code. In addition, by digitally signing verified code with trustworthiness certificates, the systems and methods described herein may enable relying parties to verify the integrity of, and confidently rely upon, such code (and, by inference, the developer and/or publisher of such code), potentially resulting in decreased instances of malware infection.

Figure 5:
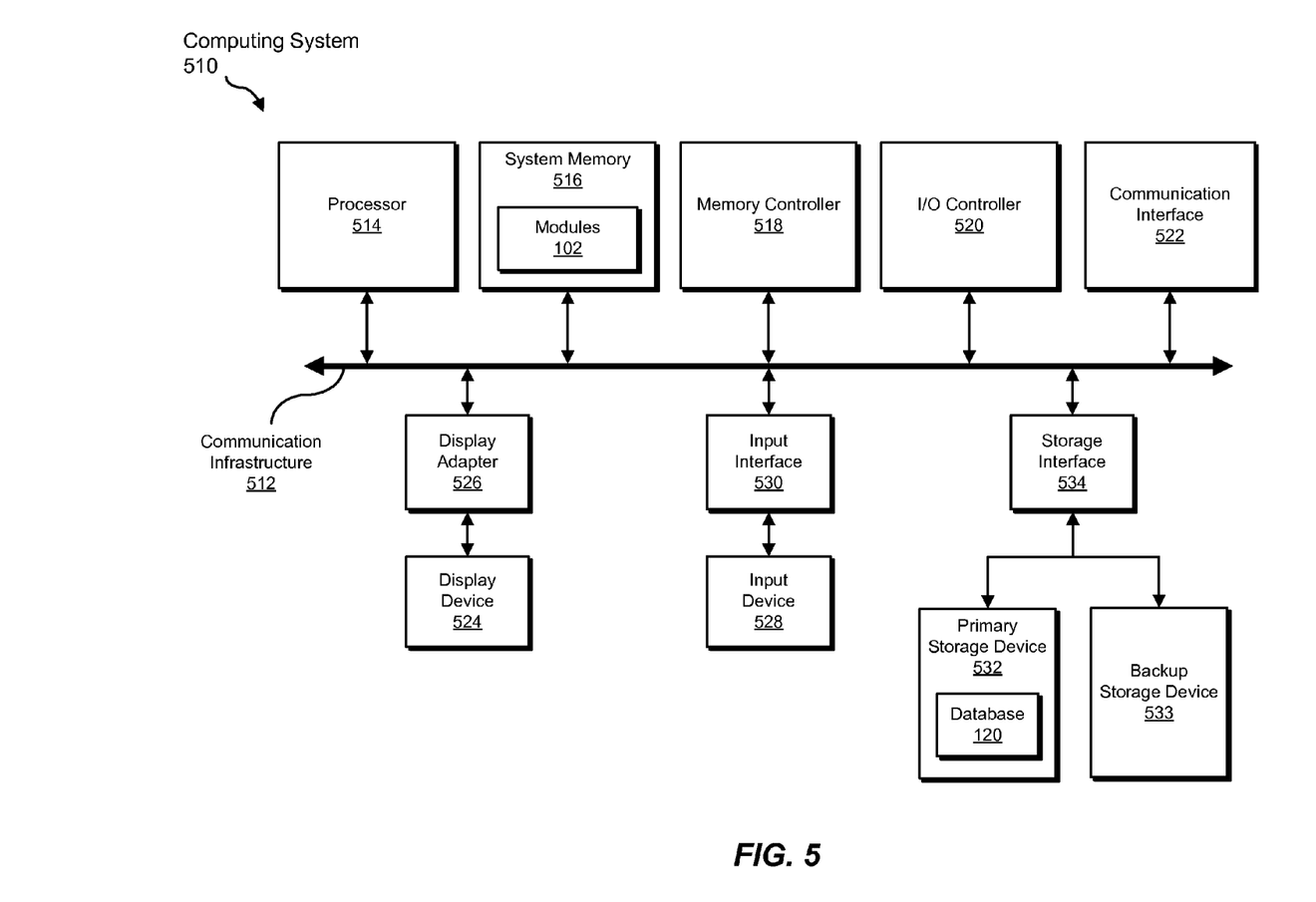
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 410 may perform and/or be a means for performing, either alone or in combination with other elements, one or more of the receiving, verifying, signing, generating, providing, scanning, testing, requesting, performing, determining, and revoking steps described herein. All or a portion of computing system 410 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network. In some examples, communications generated via communication infrastructure 512 may be secured. That is, communication interface may authenticate and/or encrypt all communications transmitted via communication infrastructure 512.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In some examples, communications generated via communication interface 522 may be secured. That is, communication interface may authenticate and/or encrypt all communications between computing system 510 and one or more additional devices.

In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
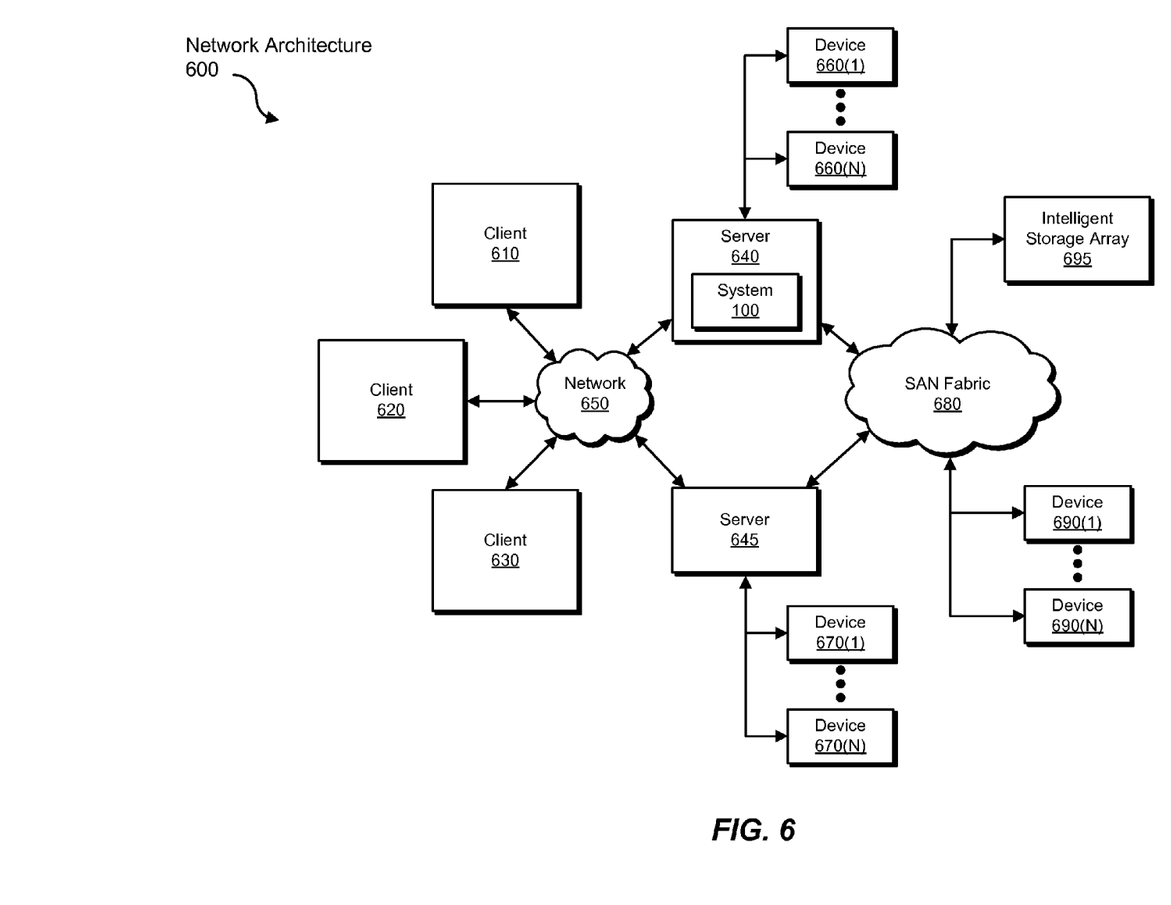
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the receiving, verifying, signing, generating, providing, scanning, testing, requesting, performing, determining, and revoking steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for providing digital certificates that certify the trustworthiness of digitally signed code.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform computing device 202 and/or code-signing service 206 into a device that is capable of verifying the trustworthiness of, and then generating digitally signed trustworthiness certificates for, code submitted for approval by software publishers.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing digital certificates that certify the integrity and trustworthiness of digitally signed code, the method comprising:
   receiving a request from a software publisher to sign code, the request comprising:
      a copy of the code;
      a digital signature that verifies the integrity of the code;
   prior to signing the code:
      verifying the integrity of the code received from the software publisher by validating the digital signature received from the software publisher;
      verifying the trustworthiness of the code received from the software publisher at least in part by testing the code received from the software publisher for vulnerabilities;
   upon verifying the integrity and trustworthiness of the code, signing the code by generating a single digitally signed trustworthiness certificate for the code that certifies both that the code originates from the software publisher and that the code itself is trustworthy;
   after signing the code, storing the code within a database;
   providing the trustworthiness certificate to the software publisher to enable the software publisher to attest that the code is trustworthy;
   performing periodic reviews of the code stored within the database in order to verify that the code remains trustworthy;
   wherein each step of the computer-implemented method is performed by a computing device comprising at least one processor.

2. The method of claim 1, wherein testing the code received from the software publisher for vulnerabilities comprises at least one of:
   scanning the code for malware;
   testing the code for at least one of bugs and objectionable behavior.

3. The method of claim 2, wherein scanning the code for malware comprises automatically scanning the code for malware using computer-security software provided by a plurality of different security-software vendors.

4. The method of claim 2, wherein testing the code for at least one of bugs and objectionable behavior comprises at least one of:
   testing the code using at least one automated test;
   receiving the results of at least one manual test performed on the code.

5. The method of claim 1, wherein validating the digital signature received from the software publisher comprises:
   calculating a checksum of the code received from the software publisher;
   obtaining an expected checksum by decrypting, using a public cryptographic key associated with the software publisher, the digital signature received from the software publisher;
   verifying that the expected checksum matches the calculated checksum.

6. The method of claim 1, wherein the trustworthiness certificate comprises metadata that indicates that the code is trustworthy.

7. The method of claim 1, wherein the trustworthiness certificate comprises a unique, code-specific certificate that is valid only for the code received from the software publisher.

8. The method of claim 1, wherein the trustworthiness certificate includes at least one of:
- information that identifies the software publisher;
- information that identifies an entity responsible for signing the code;
- a checksum of the code;
- a digital signature created using a private key.

9. The method of claim 1, further comprising:
- determining, during a periodic review of the code, that the code is no longer trustworthy;
- revoking the trustworthiness certificate upon determining that the code is no longer trustworthy.

10. The method of claim 1, wherein the computing device comprises at least one of:
- a computing device of the software publisher;
- a remote computing device operated by a code-signing service.

11. A system for providing digital certificates that certify the integrity and trustworthiness of digitally signed code, the system comprising:
- a processor;
- intake instructions, stored in memory, that, when executed by the processor, cause the processor to receive a request from a software publisher to sign code, the request comprising:
  - a copy of the code;
  - a digital signature that verifies the integrity of the code;
- verification instructions, stored in memory, that, when executed by the processor, cause the processor to verify, before the code is signed:
  - the integrity of the code received from the software publisher by validating the digital signature received from the software publisher;
  - the trustworthiness of the code received from the software publisher at least in part by testing the code received from the software publisher for vulnerabilities;
- signing instructions, stored in memory, that, when executed by the processor, cause the processor to sign the code after the integrity and trustworthiness of the code have been verified by generating a single digitally signed trustworthiness certificate for the code that certifies both that the code originates from the software publisher and that the code itself is trustworthy;
- delivery instructions, stored in memory, that, when executed by the processor, cause the processor to provide the trustworthiness certificate to the software publisher to enable the software publisher to attest that the code is trustworthy;
- wherein the verification instructions, when executed by the processor, further cause the processor to store the code within a database after the code has been signed and perform periodic reviews of the code stored within the database in order to verify that the code remains trustworthy.

12. The system of claim 11, wherein the verification instructions, when executed by the processor, further cause the processor to test the code received from the software publisher for vulnerabilities by at least one of:
- scanning the code for malware;
- testing the code for at least one of bugs and objectionable behavior.

13. The system of claim 11, wherein the verification instructions, when executed by the processor, further cause the processor to verify the trustworthiness of the code received from the software publisher in part by:
- requesting that a third-party testing entity verify the trustworthiness of the code;
- receiving an indication from the third-party testing entity that the code is trustworthy.

14. The system of claim 11, wherein the verification instructions, when executed by the processor, further cause the processor to validate the digital signature received from the software publisher by:
- calculating a checksum of the code received from the software publisher;
- obtaining an expected checksum by decrypting, using a public cryptographic key associated with the software publisher, the digital signature received from the software publisher;
- verifying that the expected checksum matches the calculated checksum.

15. The system of claim 11, wherein the trustworthiness certificate comprises a unique, code-specific certificate that is valid only for the code received from the software publisher.

16. The system of claim 11, wherein the verification instructions, when executed by the processor, further cause the processor to determine, during a periodic review of the code, that the code is no longer trustworthy, and the system further comprises revocation instructions, stored in memory, that, when executed by the processor, cause the processor to revoke the trustworthiness certificate since the code is no longer trustworthy.

17. The system of claim 11, wherein the trustworthiness certificate comprises metadata that indicates that the code is trustworthy.

18. A non-transitory computer-readable-storage medium comprising one or more computer-executable instructions that, when executed by at least one processor of a computing device, cause the computing device to:
- receive a request from a software publisher to sign code, the request comprising:
  - a copy of the code;
  - a digital signature that verifies the integrity of the code;
- prior to signing the code:
  - verify the integrity of the code received from the software publisher by validating the digital signature received from the software publisher;
  - verify the trustworthiness of the code received from the software publisher at least in part by testing the code received from the software publisher for vulnerabilities;
- upon verifying the integrity and trustworthiness of the code, sign the code by generating a single digitally signed trustworthiness certificate for the code that certifies both that the code originates from the software publisher and that the code itself is trustworthy;
- after signing the code, store the code within a database;
- provide the trustworthiness certificate to the software publisher to enable the software publisher to attest that the code is trustworthy;
- perform periodic reviews of the code stored within the database in order to verify that the code remains trustworthy.

19. The non-transitory computer-readable-storage medium of claim 18, wherein the one or more computer-executable instructions cause the computing device to test the code received from the software publisher for vulnerabilities by at least one of:
- scanning the code for malware;

testing the code for at least one of bugs and objectionable behavior.

20. The non-transitory computer-readable-storage medium of claim 18, wherein the one or more computer-executable instructions cause the computing device to verify the trustworthiness of the code received from the software publisher in part by:
   requesting that a third-party testing entity verify the trustworthiness of the code;
   receiving an indication from the third-party testing entity that the code is trustworthy.

\* \* \* \* \*